United States Patent [19]
Bilhorn

[11] Patent Number: 5,173,748
[45] Date of Patent: Dec. 22, 1992

[54] SCANNING MULTICHANNEL SPECTROMETRY USING A CHARGE-COUPLED DEVICE (CCD) IN TIME-DELAY INTEGRATION (TDI) MODE

[75] Inventor: Robert B. Bilhorn, Webster, N.Y.

[73] Assignee: Eastman Kodak Company, Rochester, N.Y.

[21] Appl. No.: 803,232

[22] Filed: Dec. 5, 1991

[51] Int. Cl.[5] .............................. G01J 3/18; G01J 3/36
[52] U.S. Cl. ...................................... 356/328; 356/308
[58] Field of Search ................ 356/308, 309, 326, 328

[56] References Cited

U.S. PATENT DOCUMENTS

| | | | |
|---|---|---|---|
| 4,253,765 | 3/1981 | Kato et al. | 356/328 |
| 4,314,275 | 2/1982 | Chapman | 358/113 |
| 4,327,377 | 4/1982 | Takken | 358/199 |
| 4,329,050 | 5/1982 | Olsen | 356/305 |
| 4,442,457 | 4/1984 | Pines | 358/213 |
| 4,575,632 | 3/1986 | Lange | 250/334 |
| 4,922,337 | 5/1990 | Hunt et al. | 358/101 |
| 4,930,892 | 6/1990 | Hadbawnik et al. | 356/328 |
| 4,952,809 | 8/1990 | McEwen | 250/342 |

FOREIGN PATENT DOCUMENTS 0113384  9/1979  Japan ................................. 356/308

OTHER PUBLICATIONS

J. V. Sweedler et al.; Fluorescence Detection in Capillary Zone Electrophoresis Using a Charge-coupled Device with Time-Delayed Integration; pp. 1-34; Sep. 20, 1990; Stanford, Calif.

P. Knoll et al.; Applied Spectroscopy; pp. 776-782; Jul. 1990 vol. 44, No. 5.

D. L. Gilblom,; TDI Imaging in Industrial Inspection; pp. 1-11; Sierra Scientific, Sunnyvale, Calif.

E. S. Schlig, IEEE Journal of Solid-State Circuits; pp. 185-186; Feb. 1986.

E. L. Dereniak and D. G. Crowe; Optical Radiation Detectors; John Wiley & Sons, NY; pp. 254-256; 1984; New York.

W. L. Wolfe and G. J. Zissis; The Infra-red Handbook; p. 12:28; 1978, Michigan.

Primary Examiner—F. L. Evans
Attorney, Agent, or Firm—Lawrence P. Trapani

[57] ABSTRACT

A spectrometer using a CCD array in the time-delay integration mode is claimed. The spectrometer comprises a CCD having a plurality of charged-coupled devices disposed along a scan dimension which terminates at an output end of the CCD. Each device produces an electronic charge in response to electromagnetic radiation incident thereon. A monochromator, optically aligned with the CCD, has a diffraction grating which generates a plurality of spectral beams from an external source of electromagnetic radiation. The diffraction grating is movably mounted to sequentially scan the plurality of spectral beams. A control unit, coupled to the monochromator, controls the scanning operation of the diffraction grating and determines a scan rate for the spectral beams. The spectral beams are scanned along the scan dimension of the CCD during the scanning operation. A clock source, coupled to the CCD, sequentially shifts the electronic charge from one charge-coupled device to another along the scan dimension of the CCD at a shift rate substantially equal to the scan rate of the spectral beams. A serial shift register, coupled to the output, end of the CCD, accumulates the electronic charge as it is shifted to the output end of the CCD. An output amplifier, coupled to the shift register, produces a video signal from the electronic charge accumulated in the serial shift register. Each produced video signal represents an intensity value for a respective spectral beams.

22 Claims, 6 Drawing Sheets

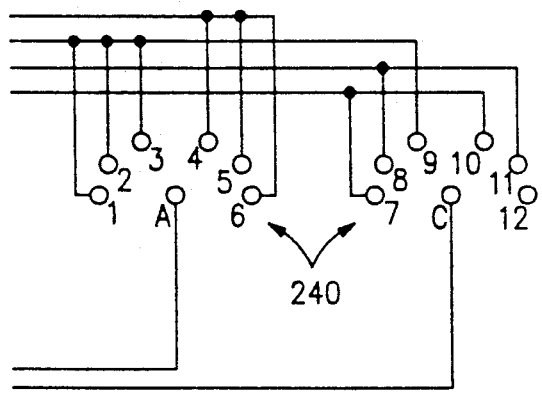
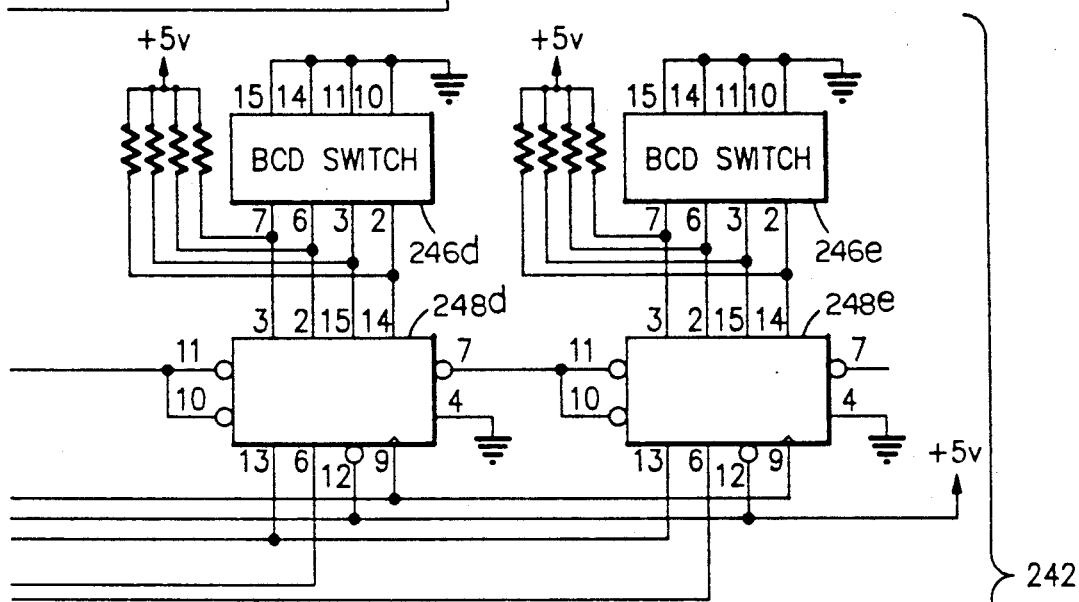
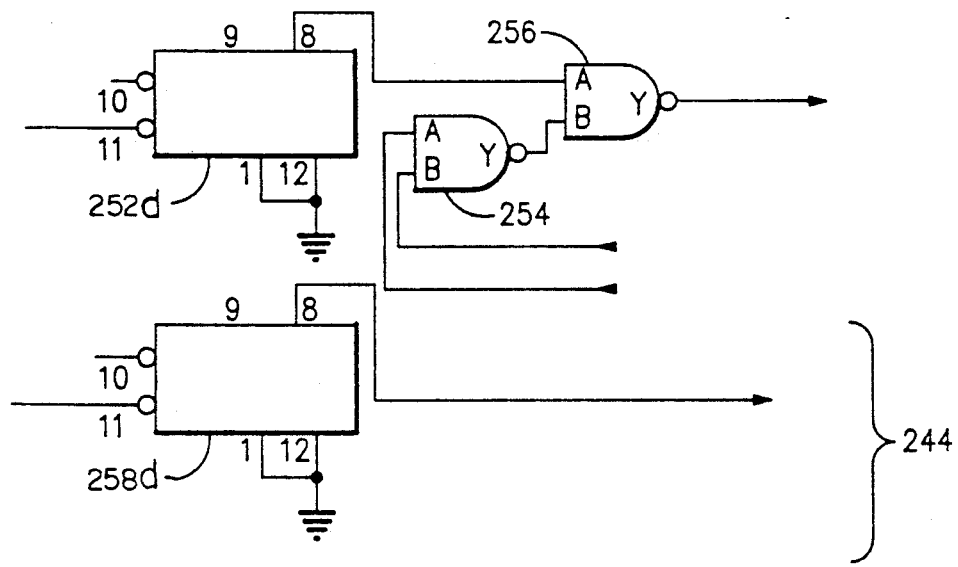
FIG.5B
FIG.5

SCANNING MULTICHANNEL SPECTROMETRY USING A CHARGE-COUPLED DEVICE (CCD) IN TIME-DELAY INTEGRATION (TDI) MODE

BACKGROUND OF THE INVENTION

1. Technical Field

The present invention relates generally to analytical spectroscopy and, more particularly, to apparatus and methods for improving the detection and measurement of spectra.

2. Background Art

The use of multichannel detectors in ultraviolet, visible and near-infrared spectroscopy has become widespread because of the inherent advantages multichannel detectors have over single channel detectors. The well known multichannel advantage arises because information at multiple wavelengths can be recorded simultaneously. The advantage is proportional to the square root of the number of simultaneous measurements. The charge-coupled device (CCD) has become particularly popular as a spectroscopic detector because scientific grade versions of these devices, when operated in slow-scan cameras, provide individual array element sensitivities that rival the best single channel detectors.

Large format two-dimensional CCD arrays have a sufficiently large number of pixels (picture elements) to meet the resolution requirements of even the most demanding analytical spectroscopic technique assuming that the spectrum can be properly composed to make effective use of the CCD. Unfortunately, the physical size of the individual device elements (at most a few tens of microns) makes it difficult to design a spectrometer which makes efficient use of the entire CCD array. For this reason, most spectroscopists currently use CCD array detectors (multichannel detectors) with spectrometers designed for single channel detectors such as photomultiplier tubes. These spectrometers disperse light in one direction, so one axis of a two-dimensional CCD array is used only to collect light from along the height of entrance slit images at the focal plane. High sensitivities are achievable with this arrangement, without the use of cylindrical lenses or other optical modification, if the effective pixel size is matched to the height of the slit images. Matching is accomplished by combining the photogenerated charge from adjacent pixels prior to readout (charge binning).

This arrangement has a substantial drawback in that a compromise between resolution and wavelength coverage is often required when using readily available CCD arrays having sizes of 512, 576, or 1024 pixels on a side. Depending on the particular spectroscopic technique, these sizes may not be sufficient to cover the desired wavelength range at adequate spectral resolution. For example, it is desirable in atomic emission spectroscopy to have resolution of 0.01 nanometers over the ultraviolet and visible spectral regions (180 to 800 nm). A 620 nm wavelength range covered at 0.01 nm resolution requires 124,000 resolution elements to satisfy the Nyquist Criterion.

The traditional approach to dealing with the resolution/wavelength coverage dilemma is to observe smaller spectral regions and to piece the resulting spectra together. Aside from the difficulties associated with maintaining wavelength calibration, problems associated with throughput variations (as a function of diffraction angle) produce undesirable baseline effects, resulting in discontinuities at the individual spectral boundaries. A recent report by P. Knoll, R. Singer, and W. Kiefer, entitled *Improving Spectroscopic Techniques by a Scanning Multichannel Method*, Appl. Spectros. 44, 776–782 (1990), proposes a partial solution to this latter problem in a photodiode array based instrument. The authors demonstrate collecting spectra at much smaller wavelength intervals than those mandated by the size of the array. The spectra are added in regions of overlap so that the variations in throughput tend to average out. The authors reduce spectral collection time in proportion to the increase in the number of spectra collected so that the overall measurement time is held constant.

The unique readout capabilities of CCDs arrays allows for a much more elegant approach to compensating for throughput variations than is possible in photodiode arrays. The general readout process in a CCD array involves shifting the photogenerated charge row by row to a serial register which then allows the sequential readout of pixels within each row. One mode of operating a CCD enables acquisition of an image which exceeds the physical size of the CCD array (in one dimension) by an arbitrary amount. This mode is called Time-Delay Integration (TDI). In this operating mode, the CCD array is exposed to a continuously moving image and the shifting of charge is synchronized with the movement of the image. The only restriction is that the direction of image movement be parallel to the column axis of the array and towards the serial register. TDI operated CCD arrays were first used in airborne reconnaissance in the early 1970's.

To the Applicant's knowledge, operating a CCD array in the TDI mode for the collection of spectra in analytical spectroscopy has not been done. TDI operation of CCD cameras is widely known in the remote image sensing field. More recently, TDI operated CCDs have been applied to the inspection of moving webs, as reported in an article by D. L. Gilblom, *TDI Imaging in Industrial Inspection*, Sierra Scientific, 1173 Borregas Ave, Sunnyvale, Calif. 94089, and in U.S. Pat. No. 4,922,337 to Hunt et al. In addition, a TDI operated CCD array has been used in analytical chemistry as described by J. V. Sweedler, J. B. Shear, H. A. Fishman, R. N. Zaire, and R. H. Scheller, *Fluorescence Detection in Capillary Zone Electrophoresis Using a Charge-Coupled Device with Time-Delayed Integration*, Anal. Chem. 63, pp. 496–502. In this application, the TDI operated CCD array is used to follow moving components separated from a mixture by capillary zone electrophoresis. A spectrograph is inserted between the image forming lens and the array so that the entire spectrum of the components can be acquired as each row of the CCD array is read. The spectrum is not detected by time-delay integration of the constituents of the spectrum.

The present invention applies the TDI mode of operation to analytical spectroscopy and eliminates the restrictions placed on wavelength coverage and resolution by finite CCD array sizes. In addition, the present invention avoids the problems associated with variations in throughput as a function of diffraction angle. Moreover, the present invention obtains the advantages of multichannel detection while benefiting from the simplicity and flexibility of available single channel spectrometers.

SUMMARY OF THE INVENTION

It is therefore an object of the present invention to provide spectroscopic apparatus and methods that avoid the problems associated with the prior art.

It is another object of the present invention to provide spectroscopic apparatus and methods having the advantages of multichannel detection.

It is a further object of the present invention to provide spectroscopic apparatus and methods that are not restricted as to wavelength coverage and resolution by finite detector array sizes.

It is yet another object of the present invention to provide spectroscopic apparatus and methods that are not affected by variations in light throughput as a function of diffraction angle.

It is yet a further object of the present invention to provide spectroscopic apparatus and methods that are compatible with relatively inexpensive and flexible single channel spectrometers.

These and other objects are attained in accordance with the present invention wherein there is provided an apparatus for resolving and detecting spectra comprising a CCD array detector. The CCD array has a plurality of photosensitive charge-coupled devices disposed along a scan dimension which terminates at an output end of the array. A beam generating device, such as a monochromator, is optically aligned with the CCD array for generating a plurality of spectral beams from a source of electromagnetic radiation. The plurality of spectral beams are emitted substantially along respective scan planes.

A scanning device is coupled to the beam generating device for sequentially scanning the plurality of spectral beams along the scan dimension of the CCD array at a scan rate. The scan plane of each spectral beam is oriented substantially at a right angle to the scan dimension during the scanning function. The charge-coupled devices of the CCD array produce electric charge in amounts proportional to the intensity of the spectral beams. A charge shifting device, such as a clock source, is coupled to the CCD array. The shifting device sequential shifts the electric charge from one charge-coupled device to another along the scan dimension of the CCD array at a shift rate substantially equal to the scan rate of the spectral beams.

A charge accumulating device, such as a serial shift register, is coupled to the output end of the CCD array. The accumulating device accumulates the electric charge as it is shifted to the output end of the CCD array and produces a video signal therefrom. A plurality of video signals is produced in response to the scanning of the plurality of spectral beams across the CCD array. The video signals represent intensity values of the plurality of spectral beams respectively.

Methods for resolving and detecting spectra are also contemplated by the present invention. These methods comprise the steps of (1) generating a plurality of spectral beams from a source of electromagnetic radiation; (2) adjusting the relative position of the plurality of spectral beams and a CCD array at an adjustment rate, the CCD array having a plurality of charge-coupled devices disposed along a scan dimension, the charge-coupled devices producing electric charge in amounts proportional to the intensity of the spectral beams; (3) sequentially shifting the electric charge from one charge-coupled device to another along the scan dimension of the CCD array at a shift rate substantially equal to the adjustment rate; and (4) accumulating the electric charge as it is shifted to the output end of the CCD array and producing a video signal therefrom. The methods of the present invention result in a plurality of video signals being produced, each representing an intensity value of a respective spectral beam.

BRIEF DESCRIPTION OF THE DRAWINGS

Further objects of the present invention will become apparent from the following description of the preferred embodiments with reference to the accompanying drawings, in which:

FIGS. 5, 5A and 5B are a schematic circuit diagram of a master clock unit employed in the closed-loop embodiment of the present invention shown FIG. 4.

DESCRIPTION OF THE PREFERRED EMBODIMENTS

Figure 1:
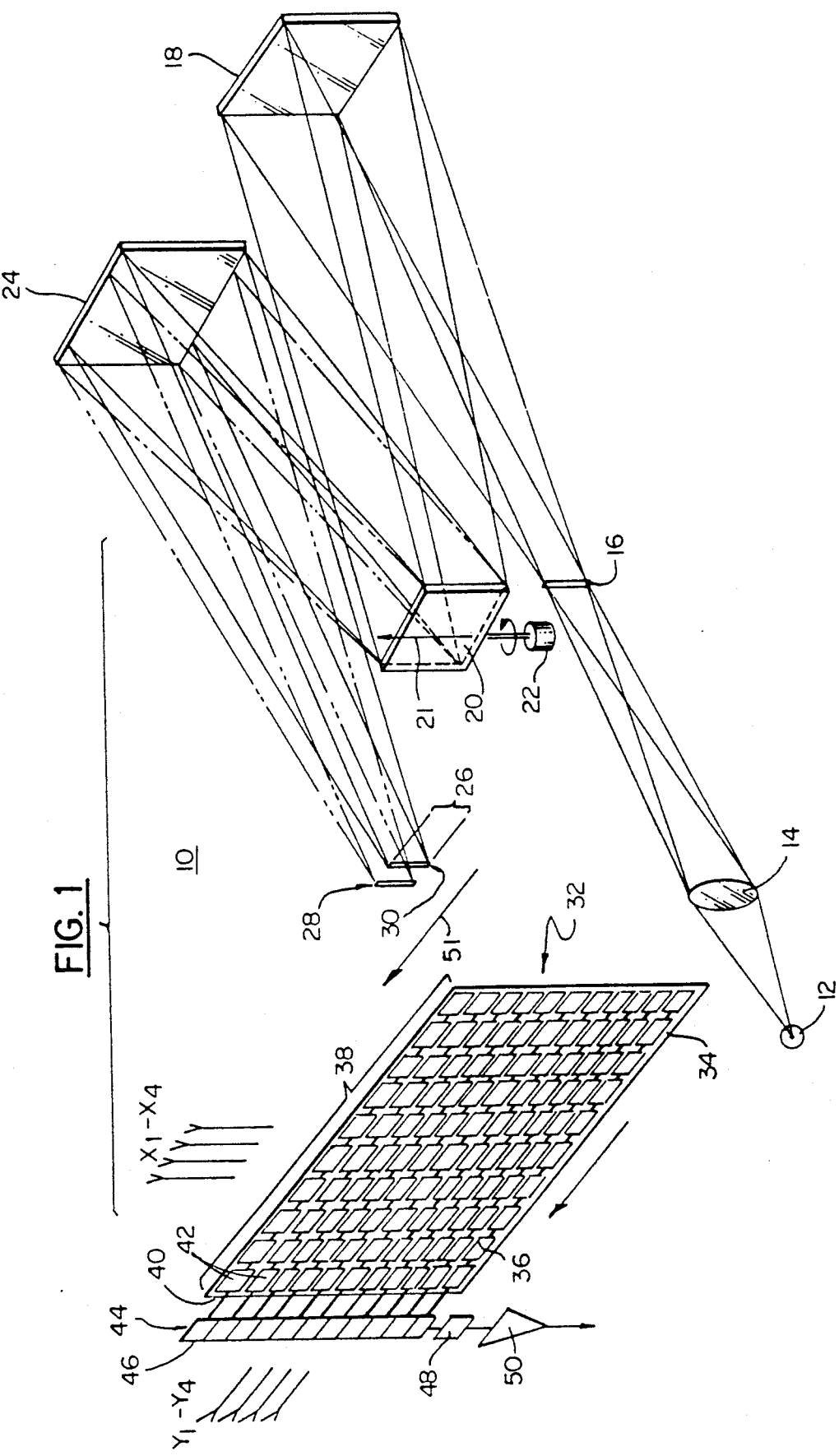
FIG. 1 is a schematic diagram showing one embodiment of a spectroscopic apparatus devised in accordance with the present invention.

Referring to FIG. 1 of the drawings, there is shown a schematic diagram of an apparatus 10 for resolving and detecting spectra of electromagnetic radiation in accordance with the present invention. In FIG. 1, the spectrum of a polychromatic light source 12 is resolved and detected by using a scanning spectroscopic system and a CCD array operated in the TDI mode. For illustration purposes, and simplicity, light source 12 comprises two primary color components.

As shown in FIG. 1, the light emitted by source 12 is focused by an optics system 14 onto an adjustable entrance slit aperture 16. Entrance slit 16 is adjusted to achieve the best compromise between light throughput and spectral resolution. In the preferred embodiment, slit aperture 16 is adjusted to have a width of 10 microns. The polychromatic light from source 12 diverges from slit 16 and is received by a spherical collimating mirror 18, as shown in FIG. 1. Mirror 18 produces a collimated polychromatic beam of light and directs it to a dispersing optical element 20. In the preferred embodiment, element 20 is a diffraction grating mounted for scanning about a vertical axis 21. Dispersing element 20 may also be a prism.

Diffraction grating 20 is scanned by a sine bar drive mechanism (not shown) which is, in turn, linked to a stepper motor 22. The sine bar drive produces a scan which is linear in wavelength, provided that stepper motor 22 is stepping at a constant rate. Alternatively, a programmable direct drive mechanism may be used whereby stepper motor 22 is connected directly to rotational axis 21 of grating 20.

As shown in FIG. 1, grating 20 resolves the polychromatic light of source 12 into two collimated spectral beams, each traveling at different angles to a focusing mirror (or "camera mirror") 24. The two spectral beams represent the respective two color components of source 12. Focusing mirror 24 projects the spectral beams along respective scan planes which intersect a focal plane 26, as shown in FIG. 1. At focal plane 26, the spectral beams are focused to produce respective images 28 and 30 of slit aperture 16.

The arrangement of entrance slit 16, collimating mirror 18, scanning diffraction grating 20 and focusing mirror 24 is referred to as the Czerny-Turner configuration. These components constitute a single channel scanning monochromator, such as the McPherson Model 2061, one meter, monochromator.

Located at focal plane 26 is a two-dimensional CCD array 32. In FIG. 1, CCD array 32 is removed from focal plane 26 for clarity and illustration purposes only. CCD array 32 comprises an image zone 34 containing 221,184 charge-coupled devices 36. Each device 36 produces an electric charge in response to electromagnetic radiation incident thereon (i.e., photogenerated charge). Devices 36 are arranged in 384 rows, each containing 576 devices. The devices of each row are aligned along a scan dimension 38 which terminates at an output end 40 of array 32. An output row 42 of devices 36 is located adjacent to output end 40. As shown in FIG. 1, a readout or serial register 44 is coupled to output row 42. CCD 32 is a full frame CCD array. However, embodiments of the present invention are not limited to this type of CCD. For example, a frame transfer CCD is also suitable. Moreover, the term "CCD" (as used herein) is not limited to traditional charge-coupled devices, but includes any charge-transfer device that can be arrayed and operated like a charge-coupled device.

CCD 32 is a four-phase CCD array which accomplishes charge transfer by a sequence of four clock signals X1-X4 in a well known manner. The photogenerated charge collected in each of devices 36 is sequentially shifted (by operation of clock signals X1-X4) from one row to the next toward output end 40 of CCD 32. The direction of charge motion is shown in FIG. 1 by an arrow at the bottom of CCD array 32.

As shown in FIG. 1, readout register 44 provides a means for accumulating the photogenerated charge as it is shifted to output end 40 of CCD 32. Photogenerated charge from output row 42 is transferred to readout register 44, again, by operation of clock signals X1-X4. Readout register 44 comprises 384 non-photosensitive charge-coupled devices 46. Each device 46 receives a charge packet from a corresponding device 36 from output row 42 in a well known manner. The accumulated charge in devices 46 are individually shifted (i.e., read out) from register 44 to a summing node 48, as shown in FIG. 1. The charge is sequentially shifted from readout register 44 by application of a sequence of four clock signals Y1-Y4 in a well known manner.

As shown in FIG. 1, an output amplifier 50 is directly connected to summing node 48, as shown in FIG. 1. Amplifier 50 produces a measurable output signal that is proportional to the quantity of charge stored in summing node 48. This quantity of charge may represent a single charge packet transferred from a single device 46 or it may represent an accumulation of charge from a number of devices 46, depending how CCD 32 is operated.

In accordance with the present invention, CCD array 32 is operated in the TDI mode. This mode of operation is described hereinbelow with reference to FIGS. 1 and 2. TDI operation in analytical spectroscopy requires that the relative position of the spectral beam under test and the CCD detection array be adjusted at some rate of speed. This rate may be constant, or it may satisfy some non-linear relationship. Position adjustment should be made such that the spectral beam passes along a straight path across the CCD, in a direction perpendicular to the rows of charge-coupled devices in the array. This arrangement allows for an operation whereby the charge transfer rate (row by row) is matched to the movement of the spectral beam as it progresses across the CCD array. Under these conditions, the charge produced by detection of the spectral beam is accumulated on each row transfer as the beam moves across the array.

In the preferred embodiment, adjustment of the relative position of the CCD and the spectral beam is accomplished by scanning the beam across the CCD. As shown in FIG. 1, images 28 and 30 are scanned along a linear path, at focal plane 26, in a scan direction 51. Beam scanning is effectuated by the scanning motion of diffraction grating 20. The scan speed of spectral beam images 28 and 30 is synchronized with the shift rate of the charge in CCD 32 so that each spectral beam moves with the charge across array 32. As a result, each spectral beam is integrated over a time period T which is equal to the incremental integration period (t) times the number of rows contained in array 32.

The total integration of each spectral beam is represented by an accumulated charge collected in register 44. For each scan of a spectral beam, the accumulated charge in register 44 is summed together to produce a value representing the intensity of that spectral beam. In FIG. 1, summing node 48 may be used to combine several or all of the charge packets from register devices 46. Digital addition of the charge signal from some or all 384 devices of register 44 may be accomplished in circuitry following amplifier 50.

Figure 2:
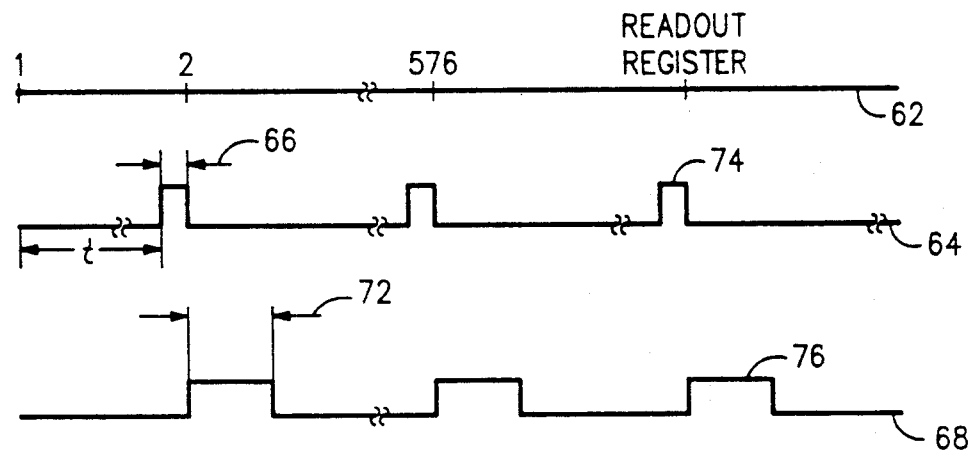
FIG. 2 is a time diagram showing the operating sequence of a CCD array in the time-delay integration mode in accordance with the present invention.

Referring to FIG. 2, there is shown a time diagram of the operating sequence of CCD array 32 in the TDI mode. The top most line (referenced by numeral 62) indicates, by row number, the position of a spectral beam along array 32. The next line (referenced by numeral 64) represents the incremental integration period (t) and charge transfer period 66 for each row. Transfer period 66 is the time required for the charge in one row to be transferred to an adjacent row. A typical value for this period is less than 10 microseconds. The bottom line (referenced by numeral 68) shows a readout period 72 of register 44, occurring after each transfer period 66. A typical value for readout period 72 is approximately 50 microseconds. However, this period may be as long as 7.7 milliseconds.

As indicated in FIG. 2, as a spectral beam is scanned over row (1) of CCD 32, the devices 36 within row (1) detect and integrate the spectral beam during period (t). After this period, charge collected in row (1) is transferred to row (2) where it will accumulate with charge generated during a second incremental integration period as the spectral beam scans over row (2). During the second integration period, serial register 44 is completely read out, as indicated by readout period 72. Note that the charge being read out of register 44, during this period, is not associated with the spectral beam being scanned over row (2). This charge may be associated with an earlier scanned beam, ambient light, etc. Not until the spectral beam has completed its scan across row (576) does the charge from register 44 correspond to that spectral beam. As shown in FIG. 2, when the spectral beam has completed scanning row (576), the accumulated charge in that row is transferred (during a transfer period 74) to register 44. After period 74, the charge from register 44 is individually transferred out during a readout period 76.

The key to the success of TDI detection in spectroscopy is the synchronization of the scanning drive of the diffraction grating with the charge transfer in the CCD array. Inaccuracies or jitter in the synchronization will result in a loss of resolution due to smearing. Synchronization can be accomplished in either open or closed-loop configurations. The relationship between the scan speed of the grating and the charge transfer speed in the CCD depends on several factors including the "reciprocal linear dispersion" and the pixel size used in the CCD array. Reciprocal linear dispersion is defined as the wavelength interval covered at the focal plane per unit distance, usually expressed as nm/mm.

Figure 3:
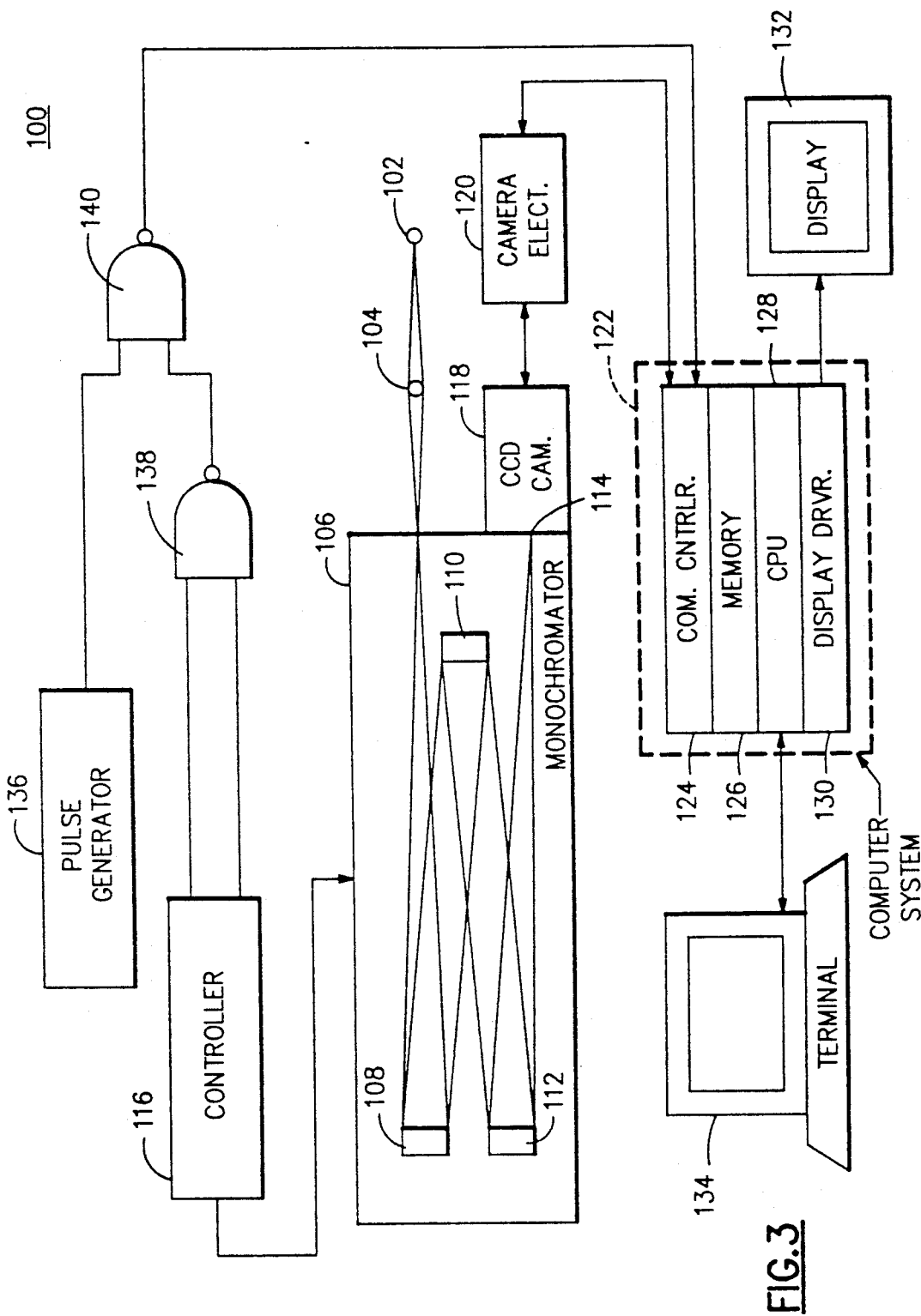
FIG. 3 is a system block diagram of an open-loop embodiment of the spectroscopic apparatus devised in accordance with the present invention.
Figure 4:
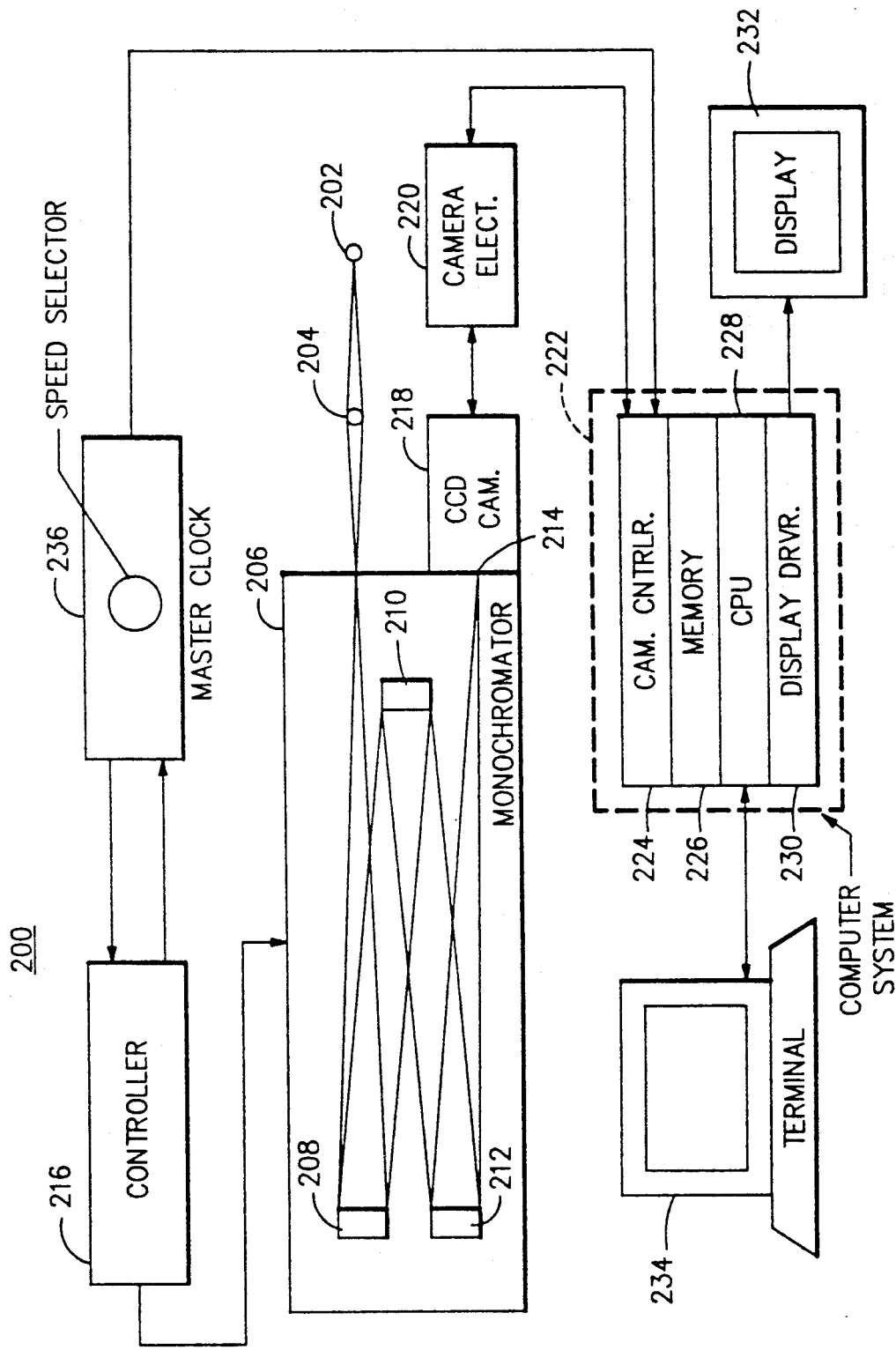
FIG. 4 is a system block diagram of closed-loop embodiment of the spectroscopic apparatus devised in accordance with the present invention.

Implementation of the TDI concept applied to analytical spectroscopy will now be described with reference to two embodiments of the present invention. An open-loop synchronization embodiment is shown in FIG. 3, and a closed-loop synchronization embodiment is shown in FIG. 4. In FIG. 3, there is shown a spectroscopy system 100 configured to analyze the emission spectrum of a low pressure mercury discharge lamp 102. Lamp 102 is a Pen-Ray mercury pen lamp, manufactured by Ultra-Violet Products, Inc., San Gabriel, Calif. The electromagnetic radiation emitted from lamp 102 is collected by a focusing lens system 104. Lens system 104 comprises, for example, a 25 mm diameter, 75 mm focal length, biconvex synthetic fused silica lens, manufactured by Melles Griot, of Irvine, Calif.

Lens system 104 focuses the emitted energy from lamp 102 onto an entrance slit contained in the housing of a monochromator 106. The entrance slit is located at the focal plane defined by lens system 104. The width of the entrance slit is adjustable and, in this embodiment, is set at 10 microns. Monochromator 106 comprises, for example, a McPherson Model 2061 one meter scanning monochromator, manufactured by GCA McPherson of Acton, Mass. Monochromator 106 comprises a spherical collimating mirror 108, a scanning diffraction grating 110 and a spherical focusing mirror 112, as schematically depicted in FIG. 3. This is the Czerny-Turner configuration as described above with reference to FIG. 1. Collimating mirror 108 and focusing mirror 112 are separate spherical mirrors. The focal length of focusing mirror 112 is one meter. Grating 110 is a 2,400 groove per mm holographic plane grating, mounted for scanning as described above with reference to FIG. 1.

Focusing mirror 112 projects a multiplicity of spectral beams (generated by grating 110) to an output focal plane, defined beyond an exit aperture 114 (see FIG. 3). The stepper motor (not shown) used to scan grating 110 is driven by a controller unit 116. Controller 116 provides the stepper motor with drive pulses at an adjustable pulse rate derived from an internal clock. Controller 116 also tracks the scan position of grating 110 and computes wavelength. Controller 116 comprises, for example, a McPherson Model 787 controller.

As shown in FIG. 3, a CCD camera system is employed to detect, record and display data concerning the emission spectrum of lamp 102. The camera system includes a CCD camera head 118, a camera electronics unit 120, and a computer system 122. System 122 provides all programmed commands, timing and power for operation of camera head 118 and camera electronics unit 120. The camera system comprises, for example, a commercially available product from Photometrics Ltd. of Tucson, Ariz. Camera head 118 comprises, for example, a Photometrics Model CH210 Camera Head (cryogenically cooled with liquid nitrogen) with a Thomson-CSF TH7882CDA CCD imager (overcoated with a UV/Blue-enhancement coating). Electronics unit 120 comprises, for example, a Photometrics Model CE200 Camera Electronics Unit with slow analog processing (14 bits at 50 kHz). Computer system 122 comprises, for example, a Photometrics Model 3000 Digital Image Acquisition and Processing System including a 68020 CPU, an image display driver, camera controller, image and video memory, and Photometrics Camera System Software.

As shown in FIG. 3, system 122 includes a camera controller 124 which provides an interface between system 122 and electronics unit 120. Camera controller 124 sends programmed commands and system timing signals to electronics unit 120. Primarily, controller 124 sends commands to unit 120 to initiate operation of the CCD imager and shutter contained in camera head 118. In addition, controller 124 receives multiple frames of image data from unit 120 and includes a DMA channel to transfer the data to a block of image memory 126 contained in system 122. Controller 124 also contains an external trigger input to allow camera exposures to be synchronized from an external trigger source.

As shown in FIG. 3, computer system 122 also includes a CPU 128 (e.g., a Motorola 68020-based single board computer with one megabyte of memory) which operates as the main computer for system 122. A display driver 130, included within system 122, has a block of video memory which provides an RS170 compatible video display of image data. The display format is 640×480 pixels with 8 bits of gray scale per pixel, and includes a 1 bit graphics overlay. As shown in FIG. 3, display driver 130 communicates with an RS170 display unit 132. Also, a user interface to CPU 128 is provided through a conventional terminal 134. A main power supply (not shown) is located in computer system 122 and provides operating power for camera head 118 and electronics unit 120.

Camera electronics unit 120 generates all necessary clock signals and voltages to operate the CCD imager contained in camera head 118. Unit 120 receives image data from camera head 118 in the form of analog signals. Unit 120 contains signal processing circuitry for amplifying these analog signals and converting them to digital format. Control of the CCD camera shutter and cooling system (normally located in camera head 118) is also provided by unit 120.

Camera head 118 contains a shutter, a CCD imager, and a cryogenic system for cooling the CCD imager. A pre-amplifier is also included for amplifying analog video signals, generated by the CCD imager, to a level suitable for electronics units 120.

Turning now to synchronization, monochromator 106 produces a reciprocal linear dispersion of 0.0083 nm per pixel. Therefore, the charge in the CCD imager of camera head 118 must be shifted one pixel row for every 0.0083 nm movement of the spectral beams at the focal plane. Each step of the stepper motor (that drives grating 110) translates to 0.001 nm movement of the spectral beams at the focal plane. The relationship between the reciprocal linear dispersion (in nm per pixel) produces by grating 110, and the step size of the stepper motor in monochromator 106, requires that the charge in the CCD be shifted once for every 8.3 stepper motor pulses. Since this is a non-integer value, simple digital division of the pulse frequency from controller 116 cannot be used for synchronization. Therefore, more elaborate techniques are required.

In FIG. 3, an open-loop synchronization technique is shown which includes an external pulse generator 136. Generator 136 comprises, for example, an HP 3325A Function Generator manufactured by Hewlett-Packard Company, Palo Alto, Calif. Generator 136 provides a TTL square wave pulse train for generating the timing for the CCD imager in camera head 118.

The output of generator 136 is gated by a pair of NAND gates 138 and 140, as shown in FIG. 3 NAND gates 138 and 140 operate to allow a pulse train to pass only when monochromator 106 is scanning. The inputs to NAND gate 138 are tied to two scan activity lines available in controller 116. The scan activity lines normally provide signals for energizing LEDs to indicate that monochromator 106 is scanning either up or down in wavelength. Thus, at any time monochromator 106 is scanning NAND gate 138 will produce a logic one (+5 volts) output, and a logic 0 (0 volts) output at all other items. The output of NAND gate 138 is connected to an input of NAND gate 140, as shown in FIG. 3. When the output of NAND gate 138 is a logic one, the pulse train output of generator 136 is inverted and allowed to pass to the output of NAND gate 140.

The inverted pulse train output of NAND gate 140 is received by camera controller 124 through its external trigger input. The pulse frequency of the output of generator 136 is adjustable, and is set to a predetermined frequency, based on the selected monochromator scan speed. Since the relationship between the selected scan speed and required charge transfer rate is constant (i.e., 8.3 stepper pulses per row transfer), it is straight forward to calculate the required pulse generator frequency for each available scan rate.

The open-loop approach of FIG. 3 suffers from the disadvantage that any drift in the scan rate, or generator pulse frequency, results in a loss of synchronization. Another disadvantage is the inconvenience of changing the generator pulse frequency each time a different scan speed is selected. A closed-loop approach avoids these disadvantages by locking the scan speed together with the charge transfer rate, so that the entire system is unaffected by drift or other instabilities. Locking is accomplished by using a single clock source for both the CCD imager and monochromator. In this way, the operation of the CCD imager is slaved to the operation of the monochromator.

Referring to FIG. 4, there is shown the preferred closed-loop synchronization embodiment of the present invention. Except for synchronization, the components in FIG. 4 are identical to those shown in FIG. 3. A mercury light source 202 emits light that is collected by a lens system 204. Lens system 204 directs light onto a slit aperture contained in a monochromator 206. Monochromator 206 contains a spherical collimating mirror 208, a scanning diffraction grating 210, and a spherical focusing mirror 212. Spectral beams generated from grating 210 are projected by mirror 212 to an output focal plane defined beyond an exit aperture 214 (see FIG. 4).

A controller 216 controls monochromator 206 in the same manner as indicated with reference to FIG. 3, except that the drive pulses are derived from an external clock, as described hereinbelow. Aligned with exit aperture 214 is a CCD camera head 218 which is, in turn, connected to a camera electronics unit 220. A computer system 222 provides the commands, timing and power to electronics unit 220 and camera 218 as described with reference to FIG. 3. System 222 comprises a camera controller 224, an image memory 226, a CPU 228 and a display driver 230. Image data is displayed on an RS170 display unit 232, and a user interface is provided through a terminal 234.

The synchronization component of the embodiment shown in FIG. 4, comprises a master clock unit 236. Clock unit 236 provides clock signals (derived from a single oscillator) to both monochromator controller 216 and camera controller 224. The use of a single oscillator in clock unit 236 guarantees that the clock frequencies for controller 216 and camera controller 224 remain locked together. A detailed description of clock unit 236 is provided below with reference to FIG. 5.

As shown in FIG. 4, controller 216 is connected to master clock unit 236 via an external clock input contained on controller 216. The external clock signal sent to controller 216 by clock unit 236 is used for deriving the stepper motor pulse frequencies. In controller 216, the external clock signal is used to generate interrupts to a system microprocessor. The microprocessor operates as a programmable counter to divide the clock frequency down to a selected rate for the stepper motor pulses. Clock unit 236 also contains circuitry to divide down the oscillator frequency to an appropriate synchronization rate for the CCD imager of camera head 218. In the setup shown in FIG. 4, controller 216 is always set to scan at 100 nm/min, and the scan speed is adjusted between 100 nm/min and 2.0 nm/min by using a rotary switch (speed selector) on clock unit 236.

Figure 5A:
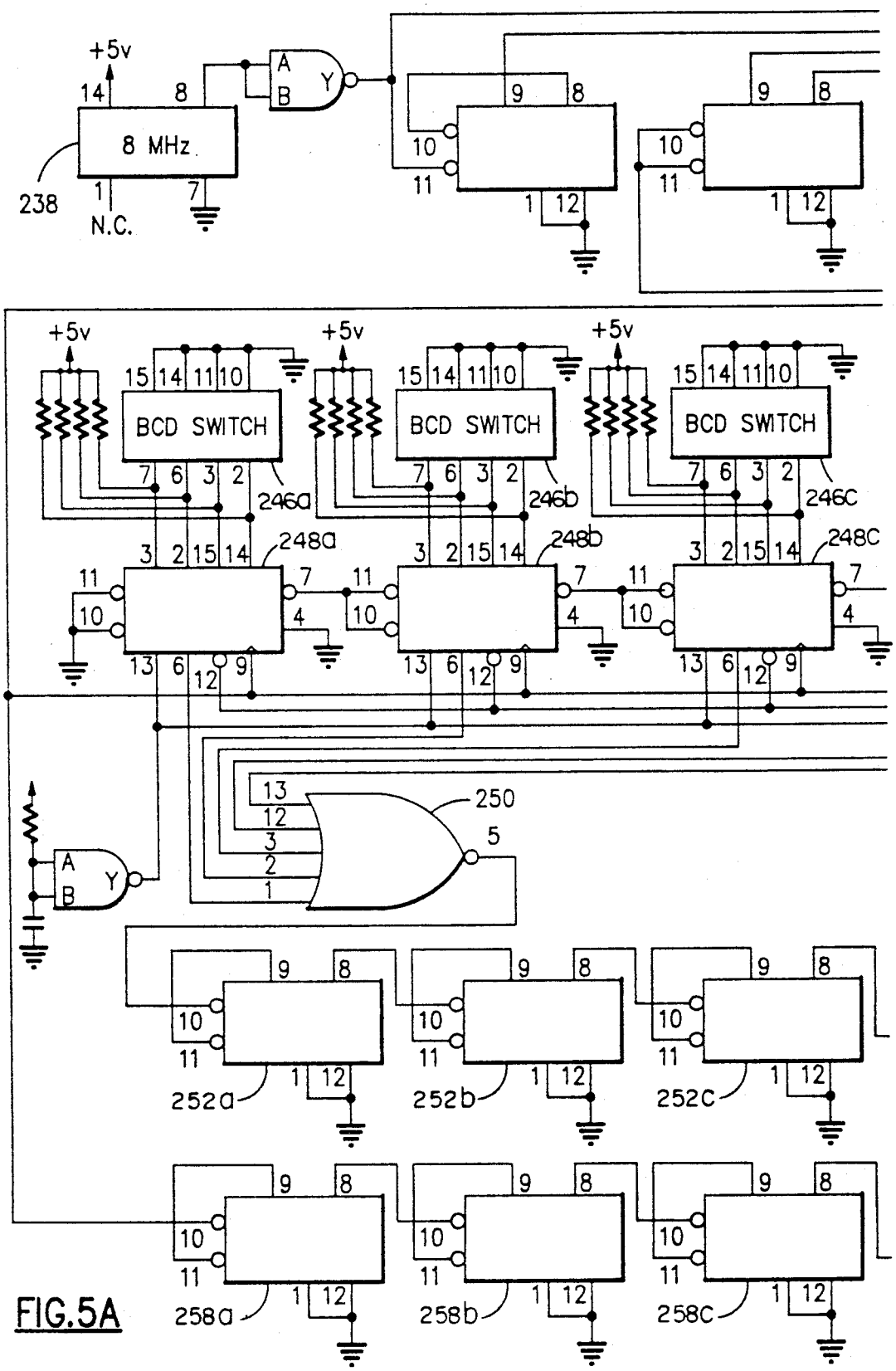

A detailed circuit diagram of master clock unit 236 is shown in FIG. 5. A quartz crystal oscillator 238 provides an 8 MHz square wave which is divided down by a factor ranging from 1 to 50 in six steps (factors of 1, 2, 5, 10, 20, 50). The steps are selected by a six position rotary switch 240. The frequency selected by the switch is presented to two divider circuits 242 and 244, as shown in FIG. 5. Circuit 242 provides the external clock frequency for the CCD imager timing, and circuit 244 provides the external clock frequency for the grating scan timing.

Since the ratio of the two external clock frequencies is determined by the CCD pixel size, reciprocal linear dispersion of the grating, and focusing mirror combination, a circuit which provides non-integer division is required. The circuit should also allow for fine adjustment to the division ratio.

As shown in FIG. 5, a five digit rate multiplier performs the initial division in circuit 242. Five binary coded decimal (BCD) switches 246a-e are used to set the division factor, as shown in FIG. 5. Switches 246a-e provide the inputs to five Texas Instrument 741s167 multiplier devices 248a-e. As shown in FIG. 5, devices 248a-e are clocked synchronously using the clock frequency selected by rotary switch 240. The Y outputs of devices 248a-e are "nored" together with an eight-input NOR gate 250, as shown in FIG. 5. NOR gate 250 comprises, for example, a Texas Instrument 741s260 device. The output of NOR gate 250 is then divided by a factor of 5,000, using four counter devices 252a-d. Counter devices 252a-d comprise, for example, Texas Instrument 741s290 devices. Devices 252a-c are wired as divided-by-10 counters and device 252d is wired as a divide-by-5 counter. Divider circuit 242 is set to multiply by a factor of 0.120.

As shown in FIG. 5B, the output of device 252d is gated by a pair of NAND gates 254 and 256. The inputs to NAND gate 254 are tied to the scan activity lines of controller unit 216. The respective outputs of NAND gate 254 and device 252d are connected to the inputs of NAND gate 256. The gating operation of NAND gates 254 and 256 is the same as that described with respect to NAND gates 138 and 140 of FIG. 3. Thus, only when monochromator 206 is scanning, does the clock signal output of device 252d appear at the output of NAND gate 256 (in inverted form). Once gated on, the output of NAND gate 256 is directed to the external trigger input on camera controller 224.

With further reference to FIG. 5, the clock signal from rotary switch 240 is also fed directly to circuit 244. Circuit 244 includes four counter devices 258a–d. Counter devices 258a–d comprise, for example, Texas Instrument 741s290 devices. In circuit 244, the clock signal from switch 240 is divided by a factor of 5,000 to produce an output on pin 8 of device 258d (see FIG. 5B). This output is fed to the external clock input on monochromator controller 216. The ratio of the output frequencies of circuit 244 and circuit 242 is 0.83.

Figure 6:
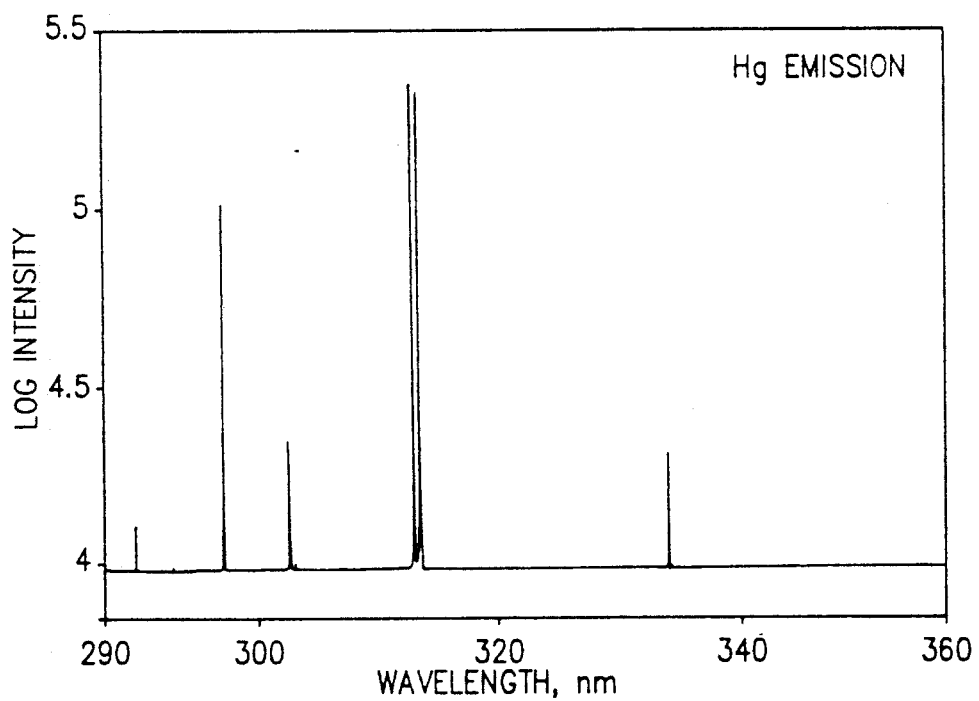
FIG. 6 is a mercury emission spectrum plot for a low pressure mercury discharge lamp obtained with the closed-loop embodiment of the present invention shown in FIG. 4.

An example of TDI performance is presented in FIG. 6. FIG. 6 shows a mercury emission spectrum plot for lamp 202. The spectrum was obtained with spectroscopy system 200 in accordance with the present invention. The plot of FIG. 6 consists of 8,396 data points. Each point represents a time-delay integration of a spectral beam (i.e., a wavelength interval of the emission spectrum of lamp 202), having been scanned across the CCD imager of camera head 218 at a rate of 20 nm/min. The CCD imager of camera head 218 contains 576 pixels in the dimension in which the mercury light was dispersed. Thus, an approximately 15 times (8,396 divided by 576) larger spectral region was detected operating the CCD in the TDI mode than in the conventional stationary mode. This example illustrates the main advantage of the present invention in eliminating restrictions placed on wavelength coverage and resolution by finite CCD array sizes.

While the preferred embodiments of the invention have been particularly described in the specification and illustrated in the drawings, it should be understood that the invention is not so limited. Many modifications, equivalents and adaptations of the invention will become apparent to those skilled in the art without departing from the spirit and scope of the invention, as defined in the appended claims.

I claim:

1. An apparatus for resolving and detecting spectra, comprising
   a CCD array having a plurality of photosensitive charge-coupled devices disposed along a scan dimension which terminates at an output end of said array, each of said devices producing an electric charge in response to electromagnetic radiation incident thereon;
   means, optically aligned with said CCD array, for generating a plurality of spectral beams from a source of electromagnetic radiation, said plurality of spectral beams being emitted substantially along respective scan planes;
   means, coupled to said beam generating means, for sequentially scanning said plurality of spectral beams along the scan dimension of said CCD array at a scan rate, the scan plane of each spectral beam being oriented at a substantially right angle to the scan dimension during said scanning function, the charge-coupled devices of said CCD array producing electric charge in amounts proportional to the intensity of the spectral beams;
   means, coupled to said CCD array, for sequentially shifting the electric charge from one charge-coupled device to another along the scan dimension of said array at a shift rate substantially equal to the scan rate of said spectral beams; and
   means, coupled to the output end of said CCD array, for accumulating the electric charge as it is shifted to the output end of said array and producing a video signal therefrom,
   whereby a plurality of video signals is produced in response to the scanning of said plurality of spectral beams across said CCD array, said video signals representing intensity values of said plurality of spectral beams respectively.

2. An apparatus as recited in claim 1, further comprising means, coupled to said scanning means and said shifting means, for synchronizing the shift rate of the electric charge with the scan rate of the spectral beams.

3. An apparatus as recited in claim 1, wherein said beam generating means comprises a scanning monochromator.

4. An apparatus as recited in claim 1, wherein said CCD array comprises a two dimensional charge-coupled device array.

5. An apparatus as recited in claim 1, wherein said scanning means includes means for providing a drive signal to said beam generating means to effectuate the scanning function of said scanning means.

6. An apparatus as recited in claim 1, wherein said electric charge shifting means comprises a clock source producing a pulse train with a period that corresponds to the scan rate of said scanning means.

7. A apparatus as recited in claim 3, wherein said scanning monochromator includes a dispersing optical element being rotatably mounted to scan said plurality of spectral beams.

8. An apparatus as recited in claim 3, wherein said scanning monochromator comprises a Czerny-Turner optical configuration having a spherical collimating mirror, a plane diffraction grating and a spherical camera mirror.

9. An apparatus as recited in claim 4, wherein said CCD array contains 576 device elements along the scan dimension of said CCD array.

10. An apparatus as recited in claim 7, wherein said dispersing optical element is a diffraction grating.

11. An apparatus as recited in claim 7, wherein said dispersing optical element is a prism.

12. An apparatus as recited in claim 7, wherein the mounting arrangement of said dispersing optical element comprises a sine bar drive and a stepper motor.

13. An apparatus as recited in claim 8, wherein the spherical camera mirror of said scanning monochromator has a focal length of one meter.

14. An apparatus as recited in claim 10, wherein said diffraction grating is a 2,400 groove per millimeter holographic plane grating.

15. An apparatus as recited in claim 12, wherein said scanning means includes means, coupled to said stepper motor, for providing a drive signal to said stepper motor to effectuate the scanning function of said scanning means.

16. A spectrometer using a CCD array in the time-delay integration mode, comprising
- a CCD array having a plurality of photosensitive charged-coupled devices disposed along a scan dimension which terminates at an output end of said CCD array, each of said devices producing an electronic charge in response to electromagnetic radiation incident thereon;
- a scanning monochromator, optically aligned with said CCD array, having a dispersing optical element which generates a plurality of spectral beams from a source of electromagnetic radiation, the plurality of spectral beams being emitted substantially along respective scan planes, the dispersing optical element being movably mounted to sequentially scan said plurality of spectral beams;
- a control unit, coupled to said monochromator, which controls the scanning operation of said dispersing optical element and determines a scan rate for the spectral beams, the scan plane of each of the spectral beams being oriented at a substantially right angle to the scan dimension of said CCD array such that the spectral beams are scanned along said scan dimension during the scanning operation, the charge-coupled devices of said CCD array producing electronic charge in amounts proportional to the intensity of the spectral beams;
- a first clock source, coupled to said CCD array, which sequentially shifts the electronic charge from one charge-coupled device to another along the scan dimension of said CCD array at a shift rate substantially equal to the scan rate of said spectral beams;
- a serial shift register, coupled to the output end of said CCD array, which accumulates the electronic charge as it is shifted to the output end of said CCD array;
- a second clock source, coupled to said serial shift register, which sequentially shifts the electronic charge in said serial register to an output node; and
- an output amplifier, coupled to the output node of said shift register, which receives the electronic charge from said shift register and produces a video signal therefrom, whereby a plurality of video signals is produced in response to the scanning of said plurality of spectral beams across said CCD array, said video signals representing intensity values of said plurality of spectral beams respectively.

17. An apparatus as recited in claim 16, further comprising means, coupled to said control unit and said first clock source, for synchronizing the shift rate of the electronic charge with the scan rate of the spectral beams.

18. An apparatus for resolving and detecting spectra, comprising
- a CCD array having a plurality of photosensitive charge-coupled devices disposed along a scan dimension which terminates at an output end of said array, each of said devices producing an electric charge in response to electromagnetic radiation incident thereon;
- means, optically aligned with said CCD array, for generating a plurality of spectral beams from a source of electromagnetic radiation, said plurality of spectral beams being emitted substantially along respective scan planes;
- means for adjusting the relative position of said plurality of spectral beams and said CCD array at an adjustment rate, the scan plane of each spectral beam being oriented substantially at a right angle to the scan dimension during said adjusting function, the charge-coupled devices of said CCD array producing electric charge in amounts proportional to the intensity of the spectral beams;
- means, coupled to said CCD array, for shifting the electric charge from one charge-coupled device to another along the scan dimension of said array at a shift rate substantially equal to the adjustment rate of said adjustment means; and
- means, coupled to the output end of said CCD array, for accumulating the electric charge as it is shifted to the output end of said array and producing a video signal therefrom, whereby a plurality of video signals is produced in response to the relative position adjustment of said plurality of spectral beams and said CCD array, said video signals representing intensity values of said plurality of spectral beams respectively.

19. An apparatus as recited in claim 18, further comprising means, coupled to said adjusting means and said shifting means, for synchronizing the shift rate of the electric charge with the adjustment rate of said adjustment means.

20. A method for resolving and detecting spectra, comprising the steps of
- generating a plurality of spectral beams from a source of electromagnetic radiation, said plurality of spectral beams being dispersed substantially along respective scan planes;
- adjusting the relative position of said plurality of spectral beams and a CCD array at an adjustment rate, the scan plane of each spectral beam being oriented substantially at a right angle to the scan dimension during said adjusting step, said CCD array having a plurality of charge-coupled devices disposed along the scan dimension, said charge-coupled devices producing electric charge in amounts proportional to the intensity of the spectral beams;
- sequentially shifting the electric charge from one charge-coupled device to another along the scan dimension of said CCD array at a shift rate substantially equal to the adjustment rate; and
- accumulating the electric charge as it is shifted to the output end of said CCD array and producing a video signal therefrom, whereby a plurality of video signals is produced in response to the relative position adjustment of said plurality of spectral beams and said CCD array, said video signals representing intensity values of said plurality of spectral beams respectively.

21. A method as recited in claim 20, wherein the adjusting step includes sequentially scanning said plurality of spectral beams along the scan dimension of said CCD array at the adjustment rate.

22. A method as recited in claim 21, further comprising the step of synchronizing the shift rate of the electric charge with the adjustment rate.

* * * * *